United States Patent [19]

Quenot

[11] 3,830,443
[45] Aug. 20, 1974

[54] LINEAR MEASURING INSTRUMENT WITH INCORPORATED BRAKING DEVICE

[75] Inventor: Michel Quenot, Desancon, France

[73] Assignee: Stanley Marbo, Besancon, France

[22] Filed: Dec. 30, 1971

[21] Appl. No.: 214,251

[30] Foreign Application Priority Data
Jan. 14, 1971 France .................. 71.01870

[52] U.S. Cl. ............ 242/84.8, 242/96, 242/99
[51] Int. Cl. ................ B65h 75/16, B65h 75/40
[58] Field of Search ....... 242/84.8, 75.4, 99, 107.3, 242/156, 96, 55.2; 33/138

[56] References Cited
UNITED STATES PATENTS

| | | | |
|---|---|---|---|
| 631,402 | 8/1899 | Lewis | 242/75.4 X |
| 1,826,465 | 10/1931 | Gilman | 242/99 |
| 2,248,482 | 7/1941 | Shearer | 242/156 X |
| 2,747,807 | 5/1956 | Hummel | 242/55.2 |
| 2,837,299 | 6/1958 | Cusack | 242/156 |
| 2,896,878 | 7/1959 | Wetzel | 242/99 |
| 2,961,184 | 11/1960 | Alford | 242/99 X |
| 2,973,918 | 3/1961 | Hancock | 242/99 |
| 3,044,732 | 7/1962 | Simonds | 242/96 |
| 3,273,820 | 9/1966 | Quenot | 242/84.8 |

Primary Examiner—John W. Huckert
Assistant Examiner—John M. Jillions
Attorney, Agent, or Firm—Robert E. Burns; Emmanuel J. Lobato; Bruce L. Adams

[57] ABSTRACT

In a tape measure comprising a handle, two spaced-apart elongated side plates extending from the handle, and a tape winding mechanism mounted between the plates, the plates are in a stressed resilient material and tend to camber inwardly but bear against lateral surfaces of the tape winding mechanism to provide a frictional braking effect when said mechanism is rotated.

9 Claims, 3 Drawing Figures

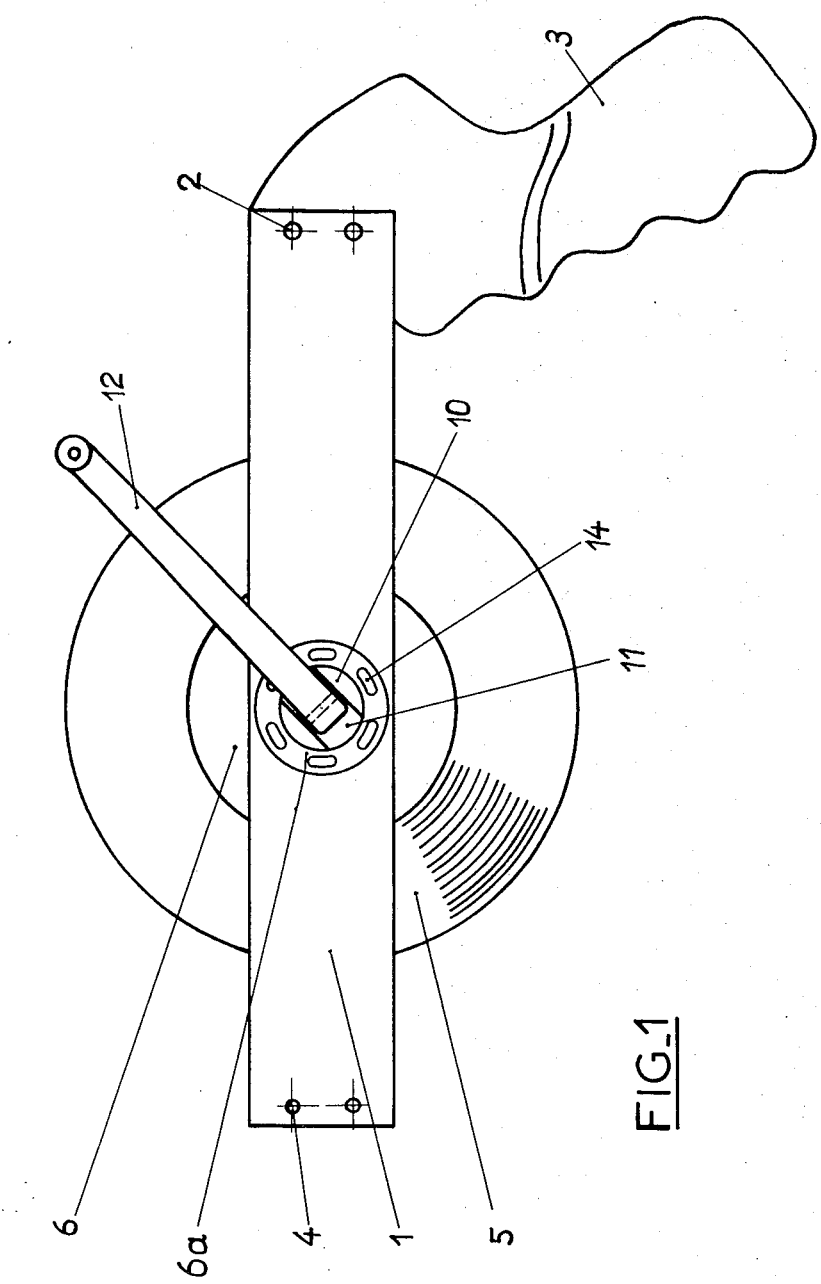
FIG_1

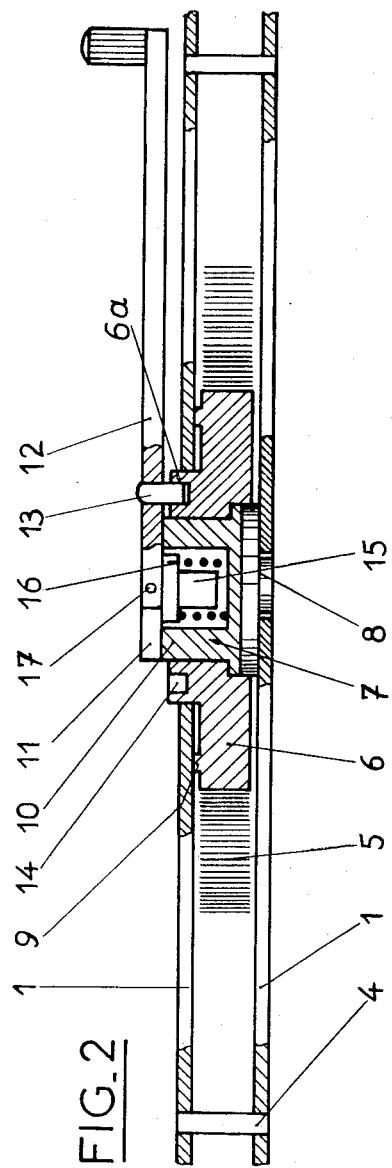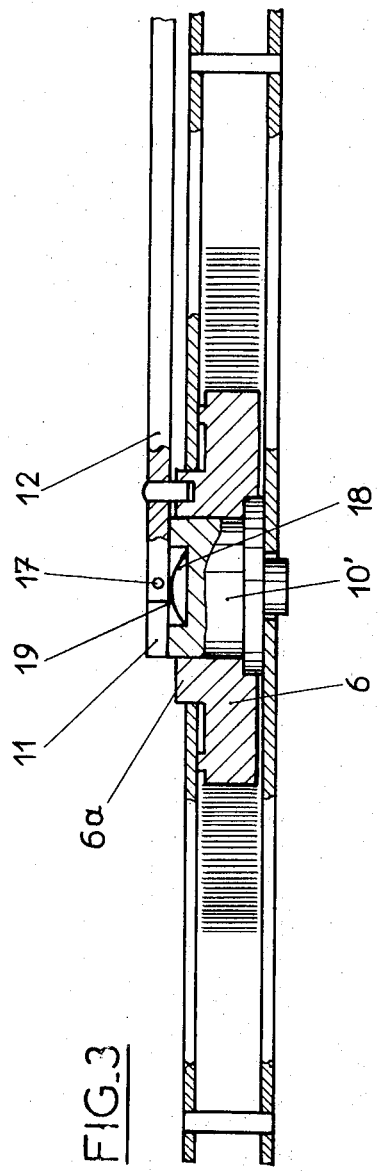

LINEAR MEASURING INSTRUMENT WITH INCORPORATED BRAKING DEVICE

The invention relates to linear measuring instruments, and more particularly to friction devices for linear tape measures adapted to slightly slow down the rotation of the tape drum and to prevent the latter from unwinding unexpectedly.

The invention particularly concerns linear tape measures with considerable winding potential and which include two elongated side-plates terminating in a handle and between which the winding mechanism is arranged.

Various friction systems for such tape measures are at present known, for example that employing elastic washers integral with the drum, placed in contact with a non-rotating element of the tape measure. Also known are means using a helical spring holding washers or rotating cheeks against fixed elements, or even directly exerting a certain friction by one side bearing against a fixed element and the other side against a rotating element.

During use with instruments using the above-mentioned friction means, various disadvantages have become apparent, namely in the first case, wear and premature fatigue of the elastic washer and, in the second case (the one using a helical spring) the necessity of using numerous complex components resulting in a relatively high cost price.

The aim of the present invention is to provide a measuring instrument with a new frictional braking device, in which the number of component parts is limited and enables the manufacture of a high quality product at a competitive cost.

A linear measuring instrument according to the invention comprises a pair of elongated spaced-apart side plates extending from a handle, and a tape winding mechanism rotatably mounted between said plates, in which at least one of the side plates is made of resilient elastically deformable material and is stressed to tend to inwardly camber, a part of said at least one plate bearing against a lateral part of the tape winding mechanism to provide a frictional braking effect upon rotation of the tape winding mechanism.

Embodiments of the invention will now be described, by way of example, with reference to the accompanying drawings, in which:

FIG. 1 is an elevational view of a tape measure according to the invention;

FIG. 2 is a schematic cross-section through the tape measure shown in FIG. 1, with the winding handle aligned with the side plates; and FIG. 3 is a view similar to FIG. 2 for a varied embodiment.

With reference to FIG. 1, the linear tape measure comprises two side-plates 1, the ends 2 of which are mounted on a haft 3 which keeps them separated by a predetermined distance. The other ends have two cross-pieces 4 holding apart the two side-plates 1 by the same distance as the handle 3. In addition, the linear tape measure includes a flexible tape 5 wound on a drum 6 integral with a driving and winding mechanism 7.

As shown in FIG. 2, the wound tape 5, the drum 6 and the driving and winding mechanism 7 are mounted between the two side-plates 1 which have a tendency to camber inwardly thereby exerting an axial thrust, on a one hand against a friction pad 8 forming one side of a hub 10 and, on the other hand, against a friction ring 9 laterally protruding from the drum 6 with a central shoulder 6a.

This tendency to camber is obviously not seen on the drawing since the cross-pieces 4 connecting the two side-plates 1 are of such a dimension that the aforementioned side-plates ar maintained flat and parallel to each other by the drum 6 and the driving and winding mechanism 7. If, for example, these side-plates were dismantled they would assume their natural spahe and their camber would be visible. These side-plates have undergone a special treatment so that they adopt a camber when no external stress is applied, and are stressed when flattened, and are made of a resilient material such as steel or another metal which conserves elasticity upon distortion.

The driving and winding mechanism 7 comprises a hub 10 fitted with a clevis 11 in which a handle 12 is pivoted about a joint 17. The handle 12 has a pin 13 which fits in one of a lurality of openings 14 in the drum 6 for this purpose. The pin 13 drives the drum 6 when he handle is placed in the drive position with the pin 13 in an opening 14 and is rotated, but can be disengaged by pivoting the handle 12 about the joint 17.

The handle 12 is held in the driving position as shown in the drawing by means of a member 15 urged by a compression spring 16 against the end of the handle 12 adjacent to the joint 17, thereby providing a stable position for the afore-mentioned handle. Similarly, when the handle 12 is folded over into the rest position, the member 15 continues to exert pressure on the opposite face of the end of the handle, and ensures a fixed and stable folded over position.

In the variant shown in FIG. 3, which has the same arrangement of side plates, drum 6, and tape as before, the drum 6 is freely mounted about a hub 10' manufactured in one piece. The hub 10' also has a clevis 11 in which a winding handle 12 is pivotally mounted about a joint 17. In addition, the hub 10' has a housing 18 in which a leaf-spring 10 is placed. Similarly to the member 15 in the previous example, this leaf-spring exerts pressure on the end of the handle 12, adjacent to the joint 17, to hold the handle 12 in the winding position as shown, or in a folded over rest position. It can be seen that in this last embodiment the number of components is minimal.

What is claimed is:

1. A linear measuring instrument, comprising a handle, a pair of elongated spaced-apart side plates extending from said handle, in which each of the side plates comprises a resilient elastically deformable material and is stressed to tend to inwardly camber, a tape winding mechanism rotatably mounted between said plates and comprising a hub having a friction pad on the outer face thereof bearing against one of said side plates, a tape drum freely mounted about the hub and having a laterally protruding friction ring mounted thereon and bearing against the other of said side plates and means defining at least one recess therein, a winding handle pivotally mounted on the hub between a winding position and a rest position, and means for releasably connecting the drum and the hub when the winding handle is in the winding position comprising a projection on the winding handle engageable with said at least one recess in said drum, whereby the portion of each side plate bearing against a part of the tape winding mechanism provides a frictional braking effect upon rotation of the tape winding mechanism.

2. An instrument according to claim 1, comprising spring means housed in a recess in the hub for releasably holding the winding handle either in its winding position or in a rest position.

3. An instrument according to claim 2, in which said spring means comprise a spring-urged member pressed against an end part of the winding handle adjacent to the pivot of the winding handle.

4. An instrument according to claim 2, in which said spring means comprise a leaf spring pressing against an end part of the winding handle adjacent to the pivot of the winding handle.

5. An instrument according to claim 1, in which both of the side plates are stressed and tend to inwardly camber, one pair of ends of the side plates is held spaced-apart by a given distance by the handle, and further including spacing means for spacing the other pair of ends of the plates apart also by said given distance, and wherein said winding mechanism is located substantially mid-way along the pair of plates and holds the plates substantially flat and parallel to one another.

6. A tape measure assembly comprising: a rotatable tape drum; two normally cambered side plates each composed of resilient elastically deformable material and disposed about said tape drum with their bowed portions facing one another; means mounting said tape drum between said two side plates for rotational movement with respect thereto and disposing a portion of said tape drum against the central portion of one of said side plates including a hub member rotatably mounted within said tape drum and having a portion thereof bearing against the central portion of the other of said side plates and receptive of the inward friction force in opposition to the rotational movement of said hub member; means maintaining said two side plates in a deformed state wherein they are substantially parallel to each other so that the central portion of said one side plate exerts an inward friction force on said tape drum in opposition to the rotational movement of said tape drum; and means for effecting manual rotational movement of said tape drum; whereby the frictional force exerted by said one side plate on said tape drum acts as a frictional braking force in opposition to the rotation of said tape drum.

7. An assembly according to claim 6, wherein said means for effecting the rotational movement of said tape drum includes a winding handle pivotally mounted on said hub and movable between a winding position and a rest position, and means for releasably connecting the drum and the hub when said winding handle is in said winding position.

8. An assembly according to claim 7, wherein said means for effecting rotational movement further includes means defining a recess in said hub member and spring means disposed in said recess for biasing said winding handle into said winding and said rest positions.

9. An assembly according to claim 6, wherein said means maintaining said two plates in a deformed state comprises a handle having a portion thereof disposed between one end portion of both plates and spacing said plates apart by a given distance, spacing means spacing the other end portion of said plates apart by said given distance, and wherein said tape drum is disposed at a central portion of both side plates.

* * * * *